United States Patent
Malek-Mohammadi et al.

(10) Patent No.: US 11,962,372 B2
(45) Date of Patent: Apr. 16, 2024

(54) CHANNEL-MATRIX DEPENDENT STEP SIZE FOR ITERATIVE PRECODING MATRIX CALCULATION

(71) Applicant: Telefonaktiebolaget LM Ericsson (publ), Stockholm (SE)

(72) Inventors: Mohammadreza Malek-Mohammadi, Solna (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 17/601,217

(22) PCT Filed: Apr. 5, 2019

(86) PCT No.: PCT/EP2019/058638
§ 371 (c)(1),
(2) Date: Oct. 4, 2021

(87) PCT Pub. No.: WO2020/200473
PCT Pub. Date: Oct. 8, 2020

(65) Prior Publication Data
US 2022/0166473 A1      May 26, 2022

(51) Int. Cl.
*H04B 7/0456*  (2017.01)
*H04L 25/02*  (2006.01)
(52) U.S. Cl.
CPC ....... *H04B 7/0456* (2013.01); *H04L 25/0226* (2013.01); *H04L 25/0244* (2013.01)

(58) Field of Classification Search
CPC .............. H04B 7/0456; H04L 25/0226; H04L 25/0244
See application file for complete search history.

(56) References Cited

U.S. PATENT DOCUMENTS

| | | | |
|---|---|---|---|
| 2008/0159425 A1* | 7/2008 | Khojastepour | H04B 7/0452 375/260 |
| 2008/0187062 A1* | 8/2008 | Pan | H04L 25/03343 708/520 |

(Continued)

OTHER PUBLICATIONS

Sayed, Ali, "Adaptive Filters", Chapters 8-14, John Wiley & Sons, Incorporated, Apr. 14, 2008, 139-208.

(Continued)

*Primary Examiner* — Afshawn M Towfighi
(74) *Attorney, Agent, or Firm* — Murphy, Bilak & Homiller, PLLC

(57) ABSTRACT

A channel matrix representing characteristics of a multi-path channel between a transmitter device (210) equipped with multiple transmitter antennas (211, 212, 213, 214, 215) and at least one receiver device (220, 230, 240) equipped with one or more receiver antennas (221, 222, 231, 232, 241, 242). The channel matrix is organized in one or more channel vectors each associated with a corresponding one of the one or more receiver antennas (221, 222, 231, 232, 241, 242). An iterative optimization algorithm is applied to determine a precoding matrix from the channel matrix. At least one step size of the iterative optimization algorithm is set depending on a vector norm of at least one of the channel vectors. Multi-antenna transmission by the transmitter device (210) is then controlled based on the determined precoding matrix.

20 Claims, 7 Drawing Sheets

(56) References Cited

U.S. PATENT DOCUMENTS

2010/0265843 A1* 10/2010 Yang .................... H04B 7/0639
375/267
2016/0285528 A1* 9/2016 Wang ..................... H04B 1/525

OTHER PUBLICATIONS

Song, Wei, et al., "Joint Conjugate Gradient and Jacobi Iteration Based Low Complexity Precoding for Massive MIMO Systems", 2016 IEEE/CIC International Conference on Communications in China (ICCC), Jul. 27, 2016, 1-6.

* cited by examiner

CHANNEL-MATRIX DEPENDENT STEP SIZE FOR ITERATIVE PRECODING MATRIX CALCULATION

TECHNICAL FIELD

The present invention relates to methods for controlling multi-antenna transmission and to corresponding devices, systems, and computer programs.

BACKGROUND

In wireless communication, it is known to utilize multi-antenna transmission for enhancing performance, e.g., in terms of throughput and/or capacity. For example, in a wireless communication network based on the LTE (Long Term Evolution) or the NR (New Radio) technology specified by 3GPP ($3^{rd}$ Generation Partnership Project), multi-user MIMO (MU-MIMO) communication may be used for serving several users simultaneously with the same time and frequency resource. In this case, an access node of the wireless communication network, in the LTE technology referred to as "eNB" and in the NR technology referred to as "gNB", and/or the user terminals, referred to as UEs (UE: user equipment), are equipped with multiple antennas. The multiple antennas enable spatial diversity for transmission of data in both an uplink (UL) direction from the UEs to the network and a downlink (DL) direction from the network to the UEs. The spatial diversity significantly increases the capacity of the network. Accordingly, the MU-MIMO technology may allow fora more efficient utilization of the available frequency spectrum. Moreover, the MU-MIMO technology can reduce inter-cell interference which in turn may allow for more frequency re-use. As the electromagnetic spectrum is a scarce resource, the MU-MIMO technology may constitute a valuable contribution when aiming at extension of the capacity of the wireless communication network.

One important aspect for an effective deployment of the MU-MIMO technology is the availability of an accurate estimate of channel responses between the access node and the UEs in the associated network cell. These channel responses may relate to both DL transmissions and UL transmissions and help to form the beams from the access node toward the targeted UEs and vice versa. The channel from a UE to the access node is typically referred to as UL channel, while the channel from the access node to the UE is typically termed DL channel. In some scenarios, the UL channel may be estimated based on pilot signals sent from the UEs to the access node, assuming reciprocity of the UL channel and the DL channel. These pilot signals are also referred to as "sounding". In the LTE and NR technology the pilot signals are referred to as Sounding Reference Signals (SRS).

Algorithms used for controlling MU-MIMO transmission are typically based on calculating a precoding matrix on the basis of channel estimates. One class of such algorithms, referred to as minimum mean square error (MMSE) algorithms, typically uses a matrix inversion to compute the precoding matrix from a channel matrix representing the channel estimate. Since the size of the matrix to be inverted depends on the number of utilized transmitter antennas, the matrix inversion becomes computationally expensive in terms of both a number of required mathematical operations and required memory needed when the number of transmitter antennas increases. This may render application of the MMSE algorithm infeasible.

Accordingly, there is a need for techniques which allow for efficiently determining a precoding matrix for multi-antenna transmission.

SUMMARY

According to an embodiment, a method of controlling multi-antenna transmission is provided. According to the method, method of controlling multi-antenna transmission. The method comprises determining a channel matrix. The channel matrix represents characteristics of a multi-path channel between a transmitter device equipped with multiple transmitter antennas and at least one receiver device equipped with one or more receiver antennas. The channel matrix is organized in one or more channel vectors each associated with a corresponding one of the one or more receiver antennas. Further, the method comprises applying an iterative optimization algorithm to determine a precoding matrix from the channel matrix. In the method, at least one step size of the iterative optimization algorithm is set depending on a vector norm of at least one of the one or more channel vectors. Further, the method comprises controlling multi-antenna transmission by the transmitter device based on the determined precoding matrix.

According to a further embodiment, a device for controlling multi-antenna transmission is provided. The device is configured to determine a channel matrix. The channel matrix represents characteristics of a multi-path channel between a transmitter device equipped with multiple transmitter antennas and at least one receiver device equipped with one or more receiver antennas. The channel matrix is organized in one or more channel vectors each associated with a corresponding one of the one or more receiver antennas. Further, the device is configured to apply an iterative optimization algorithm to determine a precoding matrix from the channel matrix. Further, the device is configured to set at least one step size of the iterative optimization algorithm depending on a vector norm of at least one of the one or more channel vectors. Further, the device is configured to control multi-antenna transmission by the transmitter device based on the determined precoding matrix.

According to a further embodiment, a device for controlling multi-antenna transmission is provided. The device comprises at least one processor and a memory. The memory contains instructions executable by said at least one processor, whereby the device is operative to determine a channel matrix. The channel matrix represents characteristics of a multi-path channel between a transmitter device equipped with multiple transmitter antennas and at least one receiver device equipped with one or more receiver antennas. The channel matrix is organized in one or more channel vectors each associated with a corresponding one of the one or more receiver antennas. Further, the memory contains instructions executable by said at least one processor, whereby the device is operative to apply an iterative optimization algorithm to determine a precoding matrix from the channel matrix. Further, the memory contains instructions executable by said at least one processor, whereby the device is operative to set at least one step size of the iterative optimization algorithm depending on a vector norm of at least one of the channel vectors. Further, the memory contains instructions executable by said at least one processor, whereby the device is operative to control multi-antenna transmission by the transmitter device based on the determined precoding matrix.

According to a further embodiment of the invention, a computer program or computer program product is provided, e.g., in the form of a non-transitory storage medium, which comprises program code to be executed by at least one processor of a device for controlling multi-antenna transmission. Execution of the program code causes the device to determine a channel matrix. The channel matrix represents characteristics of a multi-path channel between a transmitter device equipped with multiple transmitter antennas and at least one receiver device equipped with one or more receiver antennas. The channel matrix is organized in one or more channel vectors each associated with a corresponding one of the one or more receiver antennas. Further, execution of the program code causes the device to apply an iterative optimization algorithm to determine a precoding matrix from the channel matrix. Further, execution of the program code causes the device to set at least one step size of the iterative optimization algorithm depending on a vector norm of at least one of the one or more channel vectors. Further, execution of the program code causes the device to control multi-antenna transmission by the transmitter device based on the determined precoding matrix.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling of multi-antenna transmission in a wireless communication network. The wireless communication network may be based on the LTE radio technology or the NR radio technology and in particular involve DL MU-MIMO transmission from an access node of the wireless communication network, e.g., an eNB or a gNB, to multiple UEs. However, it is noted that the illustrated concepts could also be applied to other radio technologies and/or or other communication scenarios, e.g., beamformed transmission in the UL direction and/or usage of a WLAN (Wireless Local Area Network) technology.

In the illustrated examples, the multi-antenna transmission involves applying a precoding matrix to control beamforming characteristics. An iterative optimization algorithm is utilized for calculating the precoding matrix from a channel matrix. For example, the iterative optimization algorithm may be applied in an MMSE based algorithm. In order to achieve reliable and quick convergence of the iterative optimization algorithm, a step size of the iterative optimization algorithm is adapted depending on the channel matrix. A further acceleration of the algorithm may be achieved by a specific initialization of the algorithm. As a result, in some scenarios only two iterations may be sufficient to calculate the precoding matrix. Without specific initialization, four iterations may be sufficient to calculate the precoding matrix.

Figure 1:
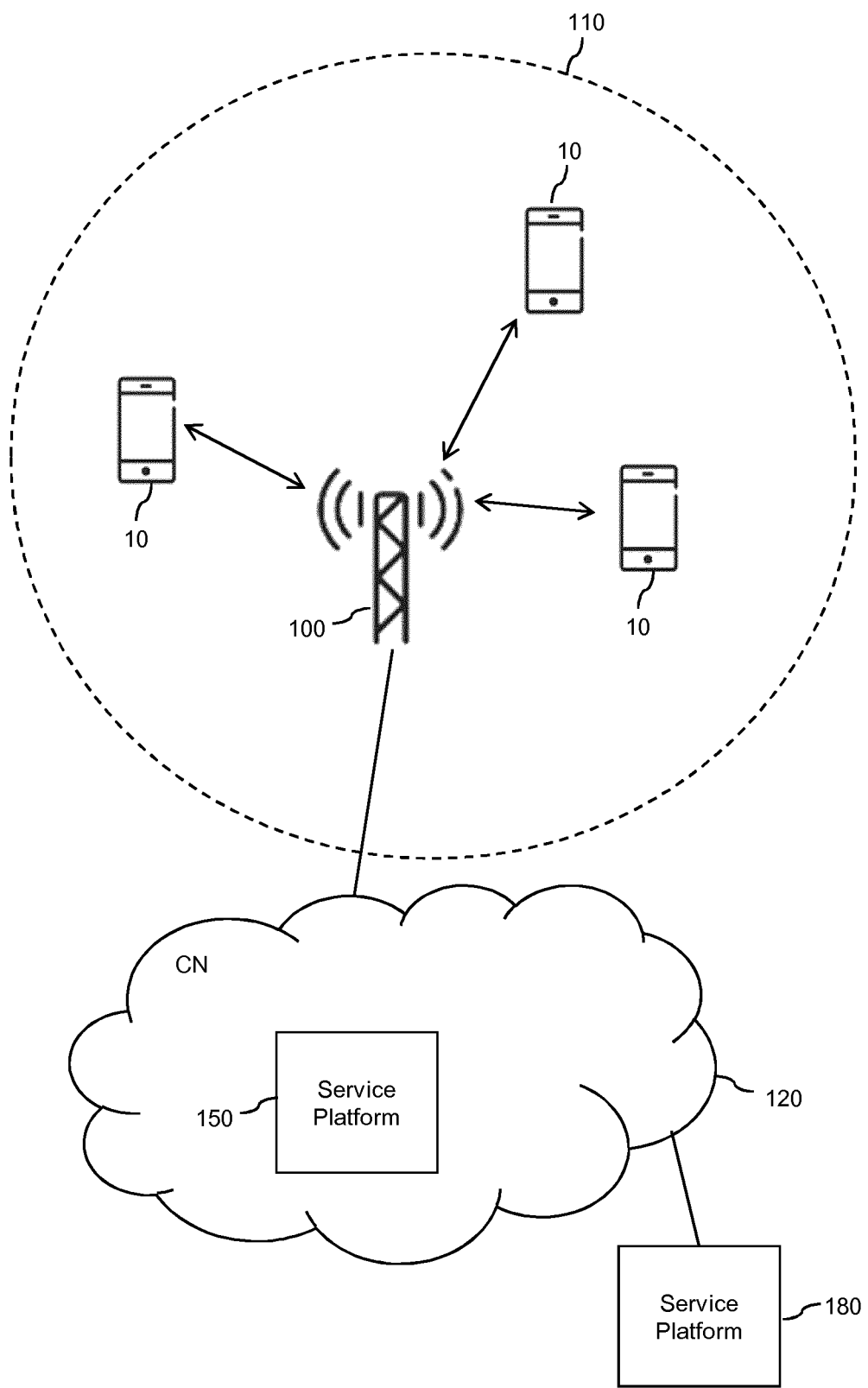
FIG. 1 schematically illustrates an exemplary wireless communication system in which multi-antenna transmission is controlled according to an embodiment of the invention.

FIG. 1 illustrates exemplary wireless communication network structures. In particular, FIG. 1 shows multiple UEs 10 in a cell 110 of the wireless communication network. The cell 110 is assumed to be served by an access node 100, e.g., an eNB of the LTE technology or a gNB of the NR technology. Further, FIG. 1 illustrates a core network (CN) 120 of the wireless communication network. As illustrated by double-headed arrows, the access node 100 may send DL transmissions to the UEs, and the UEs may send UL transmissions to the access node 100. The DL transmissions and UL transmissions may be used to provide various kinds of services to the UEs, e.g., a voice service, a multimedia service, or a data service. Such services may be hosted in the wireless communication network. By way of example, FIG. 1 illustrates a service platform 150 provided in the core network 120. The service platform 150 may for example be based on a server or a cloud computing system. Further, FIG. 1 illustrates a service platform 180 provided outside the wireless communication network. The service platform 180 could for example connect through the Internet or some other wide area communication network to the wireless communication network. Also the service platform 180 may be based on a server or a cloud computing system. The service platform 150 and/or the service platform 180 may provide one or more services to the UEs 10, using data conveyed by DL transmissions and/or UL transmissions between the access node 100 and the respective UE 10.

Figure 2:
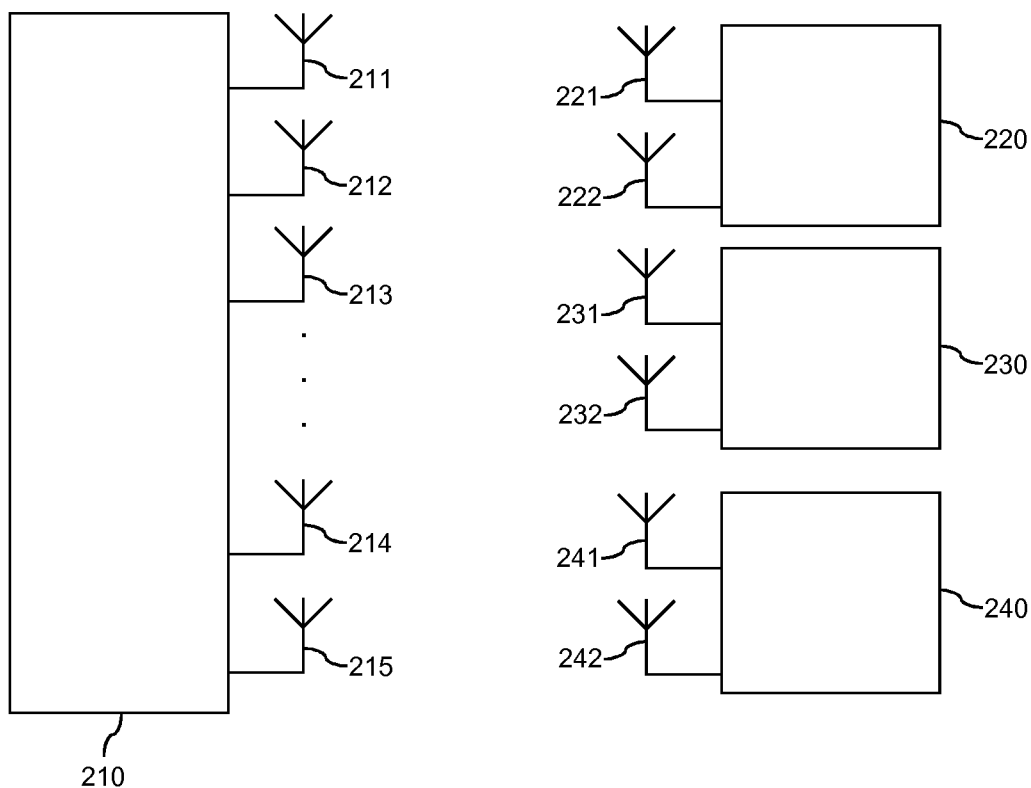
FIG. 2 schematically illustrates a MU-MIMO communication scenario according to an embodiment of the invention.

FIG. 2 schematically illustrates multi-antenna transmission between a transmitter device 210 and multiple receiver devices 220, 230, 240. Assuming DL transmissions in a wireless communication network like illustrated in FIG. 1, the transmitter device 210 may correspond to the access node 100, and the receiver devices 220, 230, 240 may correspond to the UEs 10. As illustrated in FIG. 1, the transmitter device 210 is equipped with a plurality of transmitter antennas 211, 212, 213, 214, 215. In the following explanations, the number of the transmitter antennas 211, 212, 213, 214, 215 is denoted by n. As further illustrated, each of the receiver devices 220, 230, 240 is equipped with a number of receiver antennas. Specifically, the receiver device 220 is equipped with receiver antennas 221, 222, the receiver device 230 is equipped with receiver antennas 231, 232, and the receiver device 240 is equipped with receiver antennas 241, 242. In the following explanations, p denotes the number of the considered receiver devices 220, 230, 240. For simplicity, it is assumed that the number of receiver antennas 221, 222, 231, 232, 241, 242 is the same for each of the receiver devices 220, 230, 240. The number of receiver antennas 221, 222, 231, 232, 241, 242 per receiver device 220, 230, 240 is denoted with m. It is noted that the illustrated number n of the transmitter antennas, the illustrated number p of the receiver devices, and the illustrated number m of the receiver antennas in each receiver device are merely exemplary and that other numbers of n, p, and m could be utilized as well, including the case of only one receiver antenna per receiver device, i.e., m=1.

With the above assumptions, the channel matrix $\hat{H}^{DL}$ [(pm)×n] estimated for the DL transmission direction can be written as follows:

$$\hat{H}^{DL}[(pm)\times n] = \begin{bmatrix} h_{1,1} & \cdots & h_{1,n} \\ \vdots & \vdots & \vdots \\ h_{m,1} & \cdots & h_{m,n} \\ h_{(m+1),1} & \cdots & h_{(m+1),n} \\ \vdots & \cdots & \vdots \\ h_{(2m),1} & \cdots & h_{(2m),n} \\ \vdots & \vdots & \vdots \\ h_{((p-1)m+1),1} & \cdots & h_{((p-1)m+1),n} \\ \vdots & \vdots & \vdots \\ h_{(pm),1} & \cdots & h_{(pm),n} \end{bmatrix}. \quad (1)$$

As can be seen, the channel matrix may be regarded as being composed of channel vectors (in the illustrated example corresponding to the rows of the channel matrix $\hat{H}^{DL}$). Each channel vector corresponds to a specific one of the multiple receiver antennas 221, 222, 231, 232, 241, 242 and has multiple vector components, each corresponding to a different one of the transmitter antennas 211, 212, 213, 214, 215.

A general closed-form formula for calculation of the precoding matrix, W, for an MMSE based precoding algorithms can be written as:

$$W = (\hat{H}^{DL^H}\hat{H}^{DL} + \lambda R)^{-1}\hat{H}^{DL^H}, \quad (2)$$

where $\lambda$ is a regularization parameter and R is a matrix that depends on the particular type of the utilized MMSE based precoding algorithm. For example, R can include interference and/or channel estimation error covariance matrices. The precoding matrix may be regarded as being composed of one ore more weight vectors each being associated with a corresponding one of the receiver antennas. In the illustrated example, the weight vectors correspond to columns of the precoding matrix W.

For the sake of simplicity, the illustrated example assumes a single-site scenario, with R including the channel estimation covariance matrix and intra-cell interference. As can be seen in relation (2), finding the precoding matrix W may require a matrix inversion of size n×n. This means that if n is large, which is a commonly assumed scenario in the NR technology with up to 512 antennas at the gNB, the computational complexity of the matrix inversion may be significant.

In the illustrated concepts, the computational complexity may be relaxed by utilizing an iterative optimization algorithm. With $H^{DL} = \hat{H}^{DL} + \tilde{H}^{DL}$ denoting a true DL channel matrix, where $\hat{H}^{DL}$ denotes the estimated channel matrix and $\tilde{H}^{DL}$ denotes the channel estimation error, a cost function which is to be minimized with the MMSE based precoding algorithm may be written as $$F = \frac{1}{2}\mathbb{E}\{\|H^{DL}W - I\|_F^2\}, \quad (3)$$

where $\mathbb{E}$ denotes an expectation with respect to channel estimation noise, I is an identity matrix of appropriate size, and $\|\cdot\|_F$ represents the Frobenius norm of a matrix. This yields:

$$F = \frac{1}{2}\mathbb{E}\{\text{trace}((H^{DL}W-I)^H(H^{DL}W-I))\} = \frac{1}{2}\text{trace}(\mathbb{E}\{W^H(\hat{H}^{DL}+\tilde{H}^{DL})^H(\hat{H}^{DL}+\tilde{H}^{DL})W\} - W^H\hat{H}^{DL^H} - \hat{H}^{DL}W+I) = \frac{1}{2}\text{trace}(W^H\hat{H}^{DL^H}\hat{H}^{DL}W + W^HRW) - W^H\hat{H}^{DL^H} + \hat{H}^{DL}W + n. \quad (4)$$

From relation (4), the above closed-form solution may be obtained by setting $\nabla F_W = 0$, where $\nabla F_W$ denotes the gradient of F with respect to W.

Relation (4) can be solved by applying the iterative optimization algorithm. For example, a gradient descent algorithm can be applied to solve:

$$\min_W \frac{1}{2}\mathbb{E}\{\|H^{DL}W - I\|_F^2\}, \text{ such that } \forall j, \|W^{(j)}\| = 1, \quad (5)$$

in which $W^{(j)}$ denotes the j-th column of W and $\|\cdot\|$ represents the $l_2$ norm of a vector. More specifically, with $W_i$ denoting the solution at the i-th iteration and $W_0$ representing the initial state of W, then updating of W can be accomplished according to:

$$\begin{cases} W_i = W_{i-1} - \mu \nabla F_W \\ \forall j, W_i^{(j)} = W_i^{(j)}/\|W_i^{(j)}\|, \end{cases} \quad (6)$$

where $\mu$ denotes a step size of the iterative optimization algorithm. As can be seen from (6), the gradient $\nabla F_W$, defined by $$\nabla F_W = (\hat{H}^{DL^H}\hat{H}^{DL} + R)W - \hat{H}^{DL^H}. \quad (7)$$

is calculated at $W=W_{i-1}$ and then used in a projection step to calculate the solution $W_i$ at iteration i. As can be seen, since $(\hat{H}^{DL^H}\hat{H}^{DL} + R)$ may be calculated once and can then be used for all the iterations, the gradient $\nabla F_W$ can be calculated on the basis of a single matrix multiplication per iteration, i.e., a requirement of multiple matrix multiplications per iteration can be avoided. Accordingly, the MMSE based precoding algorithm can be implemented with low computational complexity.

In the illustrated concepts, the step size $\mu$ of the iterative optimization algorithm is set depending on the estimated channel matrix $\hat{H}^{DL}$. This may be accomplished by using one or more step sizes depending on the $l_2$ norm of at least one of the above-mentioned channel vectors, i.e., the rows of $\hat{H}^{DL}$. Here, one possibility is to select one of the channel vectors and, depending on the $l_2$ norm of this channel vector, set a single step size $\mu$ which is then used for updating all columns of $W_i$. For example, the single step size $\mu$ could be set depending on channel vector with the largest value of the $l_2$ norm. However, it may be preferable to set the step size individually for each column of $W_i$: If $\mu^{(j)}$ denotes the step size for updating $W_i^{(j)}$, i.e., the j-th column of $W_i$, the step sizes may be set according to:

$$\mu^{(j)} = 1/\|\hat{H}_{(j)}^{DL}\|, \quad (8)$$

where $\hat{H}_{(j)}^{DL}$ denotes the j-th row of $\hat{H}_{(j)}^{DL}$, i.e., the channel vector for the j-th receiver antenna 221, 222, 231, 232, 241, 242. Updating of W can then be performed per columns according to:

$$\begin{cases} \forall j, W_i^{(j)} = W_{i-1}^{(j)} - \mu^{(j)}\nabla F_W \\ \forall j, W_i^{(j)} = W_i^{(j)}/\|W_i^{(j)}\| \end{cases} \quad (9)$$

Since $\mu^{(j)}$ does not change with i, the update process can be implemented with low complexity.

In the above iterative process of calculating the precoding matrix W, the speed of convergence is a function of the initial state $W_0$ used as a starting point of the iterative process. Accordingly, the convergence can be further accelerated by appropriate selection of the initial state $W_0$.

According to one example, the initial state $W_0$ can be selected based on a result of calculating the precoding matrix W for another frequency. Here, it can be utilized that in many practical implementations the calculation of the precoding matrix is accomplished for multiple frequencies, typically with a frequency granularity of one physical resource block (PRB) or even finer. However, a coarser frequency granularity of a few PRB or more is possible as well. This may result in a strong correlation between the precoding matrices W calculated for adjacent PRBs or PRBs otherwise close to each other. In other words, the difference between the precoding matrices W for adjacent PRBs is typically rather small because the coherence bandwidth of the radio channel is typically larger than a PRB. Accordingly, the precoding matrix W calculated for one frequency may constitute a good choice to be used as the initial state $W_0$ when calculating the precoding matrix for a another, e.g., neighboring, frequency. As a general rule, the difference between the two frequencies should be as small as possible. For example, when calculating the precoding matrix W with a certain frequency granularity, e.g., of one PRB or finer, the two frequencies could correspond to adjacent frequencies defined according to this frequency granularity. However, it is noted that in some scenarios the two frequencies could also be non-adjacent. For example, when calculating the precoding matrix W for a given frequency, the initial state $W_0$ for the iterative process could be set according to the precoding matrix $W_0$ as already calculated for another frequency which is within a certain frequency window around the given frequency. The size of the frequency window may be set according to an estimate of the coherence bandwidth of the radio channel. Further, the initial state $W_0$ could also be set according to the result of calculating the precoding matrix W at an earlier time. The process of selecting the initial state $W_0$ depending on existing results of calculating the precoding matrix W may also be referred to as "warm initialization". The warm initialization may help to significantly reduce the required number of iterations, e.g., to a number of four or less iterations, typically to only two iterations. Further, the warm initialization may also help to reduce the risk of the iterative process getting trapped in a local minimum.

The warm initialization may for example be used when calculating the precoding matrix W in a serial manner for multiple frequencies: After calculating the precoding matrix $W_{f0}$ for a first frequency f0, the result obtained for the first frequency f0 is utilized as the initial state $W_0$ when calculating the precoding matrix $W_{f1}$ for the next frequency f1, e.g., an adjacent frequency according to a given frequency granularity, and so on. Accordingly, starting with a first frequency, the precoding matrices W can be calculated for other frequencies, using the previously calculated precoding matrix W as the initial state $W_0$ when calculating the precoding matrix W for the next frequency. This process could also be parallelized, e.g., when using multi-core or multi-thread computational processes: If a number of K parallel computational processes is available, each of these parallel computational processes could start with a different first frequency and then continue to calculate the precoding matrices W for other frequencies, using the previously calculated precoding matrix W as the initial state $W_0$ when calculating the precoding matrix W for the next frequency. If no warm initialization is used, $W_0=0$ may be used as the initial state in the iterative process.

Various stopping criteria may be used in the iterative process. Since due to the above-mentioned setting of the step size the convergence of the iterative process is very fast, and the speed of convergence can be even further increased by using the above-described warm initialization, reaching of a preconfigured number of iterations may be used as a stopping criterion. For example, if the warm initialization is used, the iterative process may be stopped after the second iteration. If the warm initialization is not used, the iterative process may be stopped after the fourth iteration. No further criteria, such as checking a relative difference between two consecutive iterations, need to be checked, thereby enabling a low complexity implementation of stopping the iterative process. However, it is noted that such criteria could be utilized as well. For example, the iterative process could be stopped if the relative difference between two consecutive iterations falls below a threshold, e.g., of $10^{-3}$.

Figure 3:
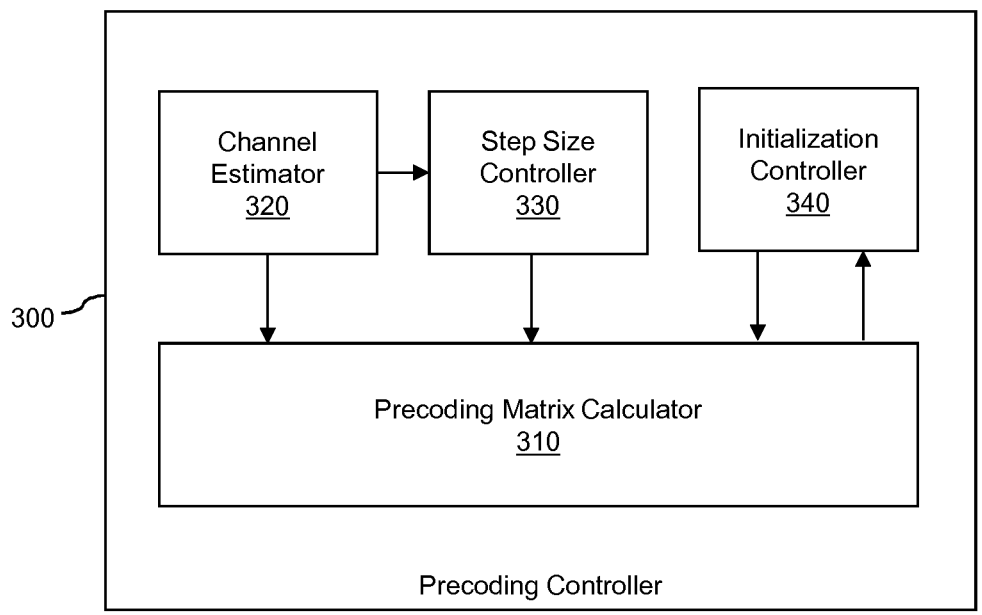
FIG. 3 schematically illustrates a precoding controller according to an embodiment of the invention.

FIG. 3 schematically illustrates a precoding controller 300 which may be used to implement the illustrated concepts. The precoding controller 300 could be implemented by the transmitter device 210 and provide the precoding matrices utilized by the transmitter device 210 when performing the multi-antenna transmissions. However, it is noted that at least a part of the precoding controller 300 could also be implemented separately from the transmitter device 210, e.g., by a standalone node and/or by one or more of the receiver devices 220, 230, 240.

As illustrated, the precoding controller 300 includes a precoding matrix calculator 310. The precoding matrix calculator 310 is configured to calculate the precoding matrix using the MMSE based precoding algorithm together with an iterative optimization algorithm as explained above. As further illustrated, the precoding controller 300 includes a channel estimator 320. The channel estimator 320 may be configured to provide the above-mentioned estimate of the channel matrix. For example, the channel estimator could apply channel reciprocity and estimate the channel matrix from signals, e.g., sounding or reference signals, transmitted from the receiver devices 220, 230, 240 to the transmitter device 210. This option may be particularly useful when using a TDD mode of the transmissions between the transmitter device 210 and the receiver devices 220, 230, 240. Alternatively or in addition, the channel estimator 320 could estimate the channel matrix from signals, e.g., sounding or reference signals, transmitted from the transmitter device 210 to the receiver devices 220, 230, 240. The estimation process could then further involve reporting of measurements from the receiver devices 220, 230, 240 to the transmitter device 210.

As further illustrated, the precoding controller 300 includes a step size controller 330. As input, the step size controller 330 receives the estimated channel matrix from the channel estimator 320 and uses the channel vectors forming the channel matrix as a basis to set the above-mentioned step size $\mu$ or $\mu^{(j)}$ utilized by the precoding matrix calculator 310, e.g., by determining the step sizes according to (8). The step size controller 330 provides the determined setting of the step size(s) to the precoding matrix calculator 310, which controls the iterative optimization algorithm accordingly.

As further illustrated, the precoding controller 300 includes an initialization controller 340. The initialization controller 340 is responsible for initializing the iterative optimization algorithm applied by the precoding matrix calculator 310. As explained above, this may involve a warm initialization based on an initial state which depending on existing results of calculating the precoding matrix, e.g., for another frequency.

Figure 4:
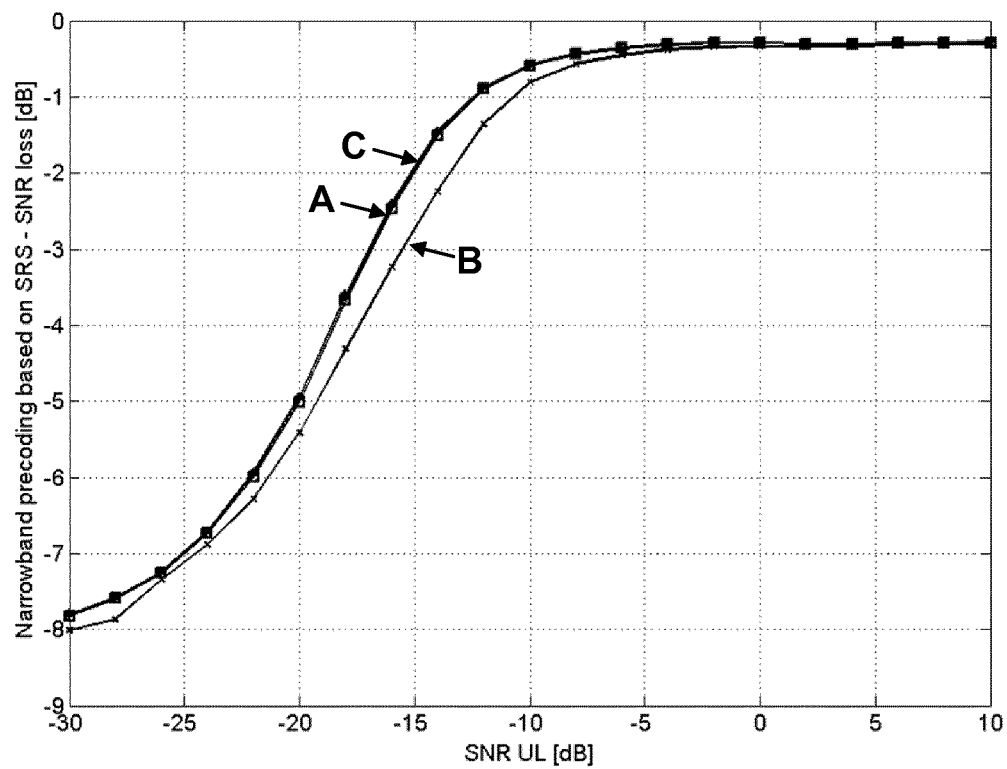
FIGS. 4 and 5 shows exemplary simulation results for illustrating performance of precoding matrix calculation according to an embodiment of the invention.
Figure 5:
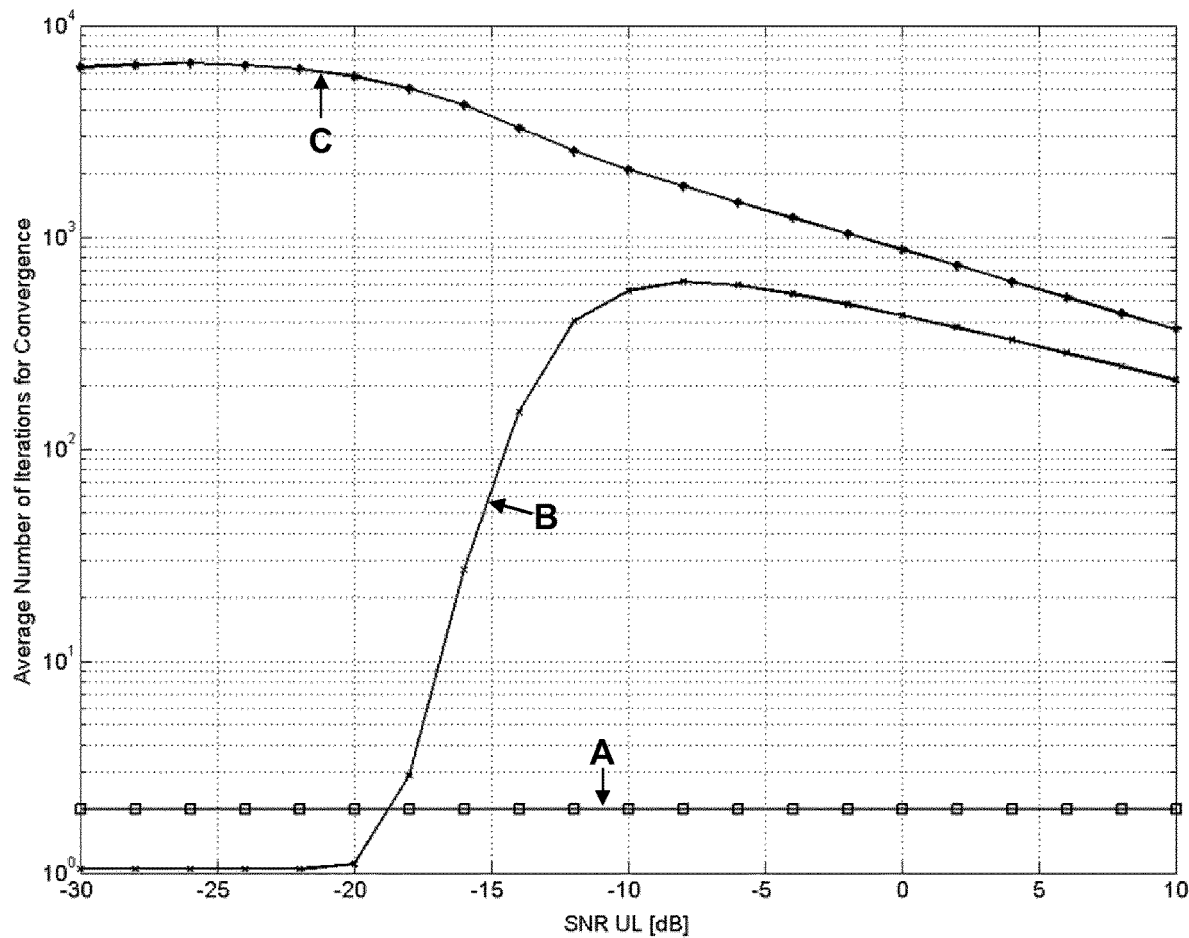

FIGS. 4 and 5 show results of exemplary numerical simulations which demonstrate effectiveness and performance of the above-described precoding matrix calculation algorithm. The simulations assume utilization of the NR technology for DL transmissions from the gNB to the UE, with eight antennas at the gNB and two antennas at the UE. The particular MMSE based precoding algorithm which was considered in the simulations minimizes the cost function as given in (3). In FIG. 4, a metric referred to as precoding SNR loss is used to compare the performance of the precoding matrices from the illustrated concepts assuming a channel matrix dependent setting of the step size $\mu$ and stopping the iterative process after two iterations, denoted by "A", to precoding matrices from conventional iterative implementations of the same MMSE based algorithm, denoted by "B" and "C". The conventional iterative implementation assumed for plot "B" uses a fixed step size of $\mu=0.1$ and a stopping criterion involving stopping the iterative process when the relative difference of two consecutive iterations is below $10^{-3}$. The conventional iterative implementation assumed for plot "C" uses a fixed step size of $\mu=0.1$ and a stopping criterion involving stopping the iterative process when the relative difference of two consecutive iterations is below $10^{-4}$. The precoding SNR loss denotes the loss that a practical precoder would have as compared to a precoder that knows the true channel as a function of UL SNR. In FIG. 4, plot "A" is almost coincident with plot "C". FIG. 5 shows the average number of iterations that the MMSE based precoding algorithm needs to converge.

As can be seen, the precoding matrices obtained by the inventive concepts offer a better performance than the precoding matrices obtained by the conventional iterative implementation of plot "B" and substantially the same performance as the conventional iterative implementation of plot "C", however with a significantly lower number of iterations. Further, it was found that the precoding matrices obtained by the inventive concepts offer substantially the same performance as precoding matrices obtained by non-iterative calculation using a matrix inversion, however with significantly lower computational complexity. Further, it can be seen that the conventional iterative processes require a lot of iterations to converge, 200 to 600 iterations at medium and high SNR in the case of plot "B", and even 300 to 6000 iterations in the case of plot "C".

Figure 6:
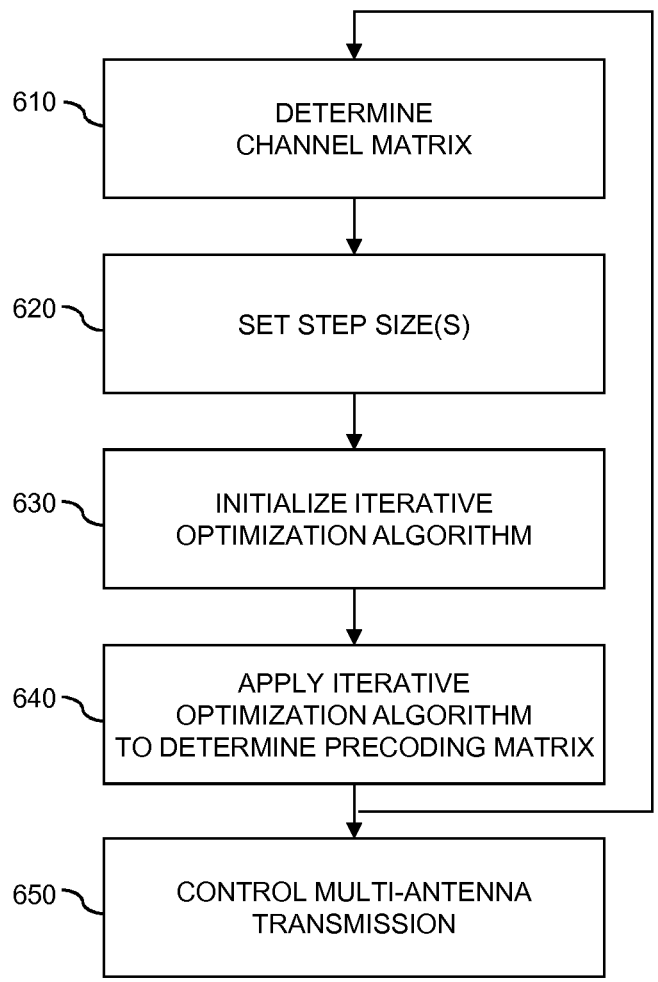
FIG. 6 shows a flowchart for illustrating a method according to an embodiment of the invention.

FIG. 6 shows a flowchart for illustrating a method of controlling multi-antenna transmission, which may be utilized for implementing the illustrated concepts. The method of FIG. 6 may be used for implementing the illustrated concepts in a device for controlling multi-antenna transmission, e.g., corresponding to any of the above-mentioned entities 10, 100, 210, 220, 230, 240, or 300.

If a processor-based implementation of the device is used, at least some of the steps of the method of FIG. 6 may be performed and/or controlled by one or more processors of the device. Such device may also include a memory storing program code for implementing at least some of the below described functionalities or steps of the method of FIG. 6.

At step 610, a channel matrix is determined. The channel matrix represents characteristics of a multi-path channel between a transmitter device, such as the above-mentioned access node 100 or the above-mentioned transmitter device 210, and at least one receiver device, such as the above-mentioned UEs 10 or receiver devices 220, 230, 240. Accordingly, the transmitter device may be an access node of a wireless communication network and the at least one receiver device may be a wireless communication device connected to the wireless communication network.

The transmitter device is equipped with multiple transmitter antennas, such as the above-mentioned transmitter antennas 211, 212, 213, 214, 215. The at least one receiver device is equipped with one or more receiver antennas, such as the above-mentioned antennas 221, 222, 231, 232, 241, 242. The channel matrix is organized in one or more channel vectors each associated with a corresponding one of the one or more receiver antennas. As explained in the above example, the channel vectors may correspond to rows of the channel matrix. However, depending on the way of defining the channel matrix, the channel vectors could also correspond to columns of the channel matrix.

The channel matrix may be determined based on measurements on signals transmitted from the receiver device to the transmitter device, e.g., based on assuming channel reciprocity. Alternatively or in addition, the channel matrix may be determined based on measurements on signals transmitted from the transmitter device to the at least one receiver device. The latter option may additionally involve reporting of measurements from the at least one receiver device to the transmitter device.

At step 620, one or more step sizes of an iterative optimization algorithm are set depending on a vector norm of at least one of the channel vectors. The iterative optimization algorithm has the purpose of determining a precoding matrix from the channel matrix. The precoding matrix is composed of one or more weight vectors each being associated with a corresponding one of the one or more receiver antennas. The weight vectors may correspond to columns of the precoding matrix. However, depending on the way of defining the precoding matrix, the weight vectors could also correspond to rows of the precoding matrix.

In some scenarios, if there are multiple receiver antennas and corresponding channel vectors and associated weight vectors, multiple step sizes of the iterative optimization algorithm may be set individually for each of the weight vectors, depending on the vector norm of the associated channel vector.

The at least one step size can be set to be inversely proportional to the vector norm of the at least one channel vector. The vector norm may correspond to the $l_2$ norm, i.e., Euclidian norm, of the at least one channel vector. However, it is noted that another type of vector norm could be used as well.

At step 630, the iterative optimization algorithm may be initialized by setting an initial state of the iterative optimization algorithm. This may involve selecting the initial state depending on existing results of calculating the precoding matrix, e.g., the precoding matrix as calculated for another frequency.

At step 640, the iterative optimization algorithm is applied with the step size(s) of step 620 to determine the precoding matrix from the channel matrix. Step 640 may involve determining the precoding matrix by an MMSE based algorithm.

In some scenarios, step 640 may involve determining a precoding matrix for each of multiple different frequencies. In this case, for at least one of the frequencies in a first iteration of the iterative optimization algorithm an initial state of the precoding matrix may be based on a precoding matrix as previously determined for another frequency, e.g., an adjacent frequency or frequency within a certain frequency window. This initial state may be set at step 630.

In some scenarios, the iterative optimization algorithm may be stopped in response to reaching a preconfigured number of iterations. This preconfigured number of iterations may be four or less, in particular two. In some scenarios, the preconfigured number may depend on the way of initializing the iterative optimization algorithm. For example, the preconfigured number could be lower when using a warm initialization based on a previously determined precoding matrix, e.g., for another frequency.

In some scenarios, each iteration of the iterative optimization algorithm may involve calculating an adjustment matrix based on the at least one step size, the present state of the precoding matrix, and the channel matrix, and updating the present state of the precoding matrix by subtracting the adjustment matrix, e.g., by updating the precoding matrix according to relation (6) or (9). As explained above, in each iteration of the iterative optimization algorithm calculating the adjustment matrix may involve only a single matrix multiplication, i.e., the number of matrix multiplications required in each iteration is no more than one.

As illustrated, steps 610, 620, 630, and 640 may be repeated, e.g., to calculate the precoding matrix for multiple different frequencies.

At step 650, multi-antenna transmission by the transmitter device is controlled based on the determined precoding matrix. This may involve providing the precoding matrix to the transmitter device or using the precoding matrix to generate other control signals for controlling multi-antenna transmission by the transmitter device.

Figure 7:
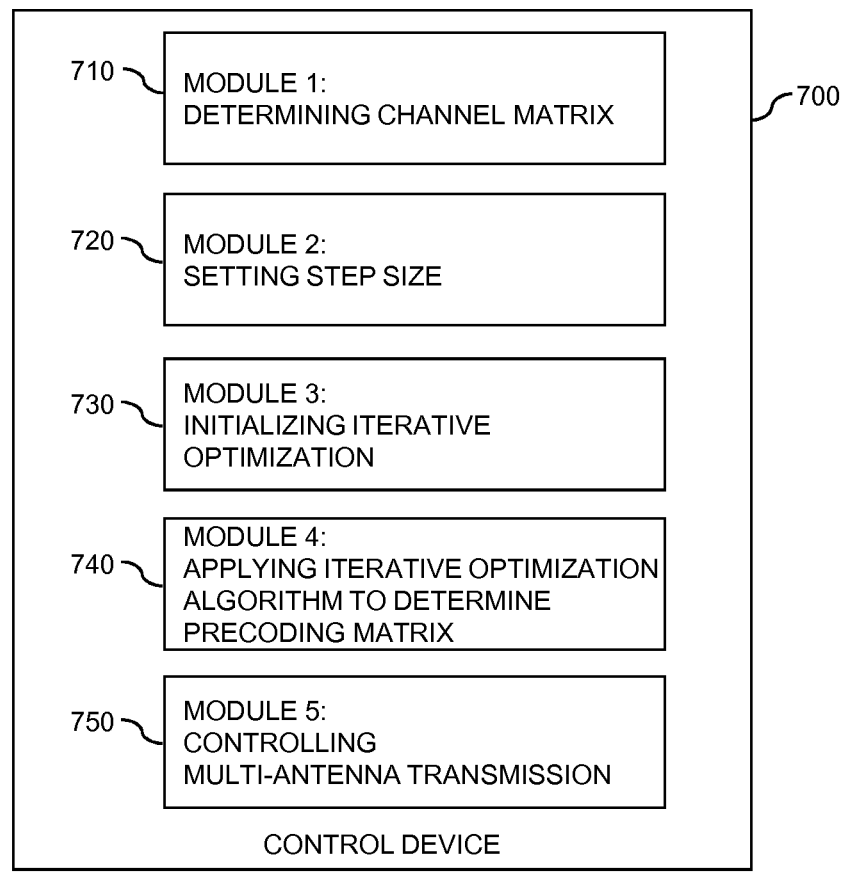
FIG. 7 shows an exemplary block diagram for illustrating functionalities of a device implementing functionalities corresponding to the method of FIG. 6.

FIG. 7 shows a block diagram for illustrating functionalities of a device 700 which operates according to the method of FIG. 6. The device 700 may for example correspond to be part of any of the above-mentioned entities 10, 100, 210, 220, 230, 240, or 300. As illustrated, the device 700 may be provided with a module 710 configured to determine a channel matrix, such as explained in connection with step 610. Further, the device 700 may be provided with a module 720 configured to determine at least one step size of an iterative optimization algorithm, such as explained in connection with step 620. Further, the device 700 may be provided with a module 730 configured to initialize the iterative optimization algorithm, such as explained in connection with step 630. Further, the device 700 may be provided with a module 740 configured to apply the iterative optimization algorithm to determine a precoding matrix, such as explained in connection with step 640. Further, the device 700 may be provided with a module 750 configured to control multi-antenna transmission, such as explained in connection with step 650.

It is noted that the device 700 may include further modules for implementing other functionalities, such as known functionalities of an access node or other type of transmitter device or receiver device. Further, it is noted that the modules of the device 700 do not necessarily represent a hardware structure of the device 700, but may also correspond to functional elements, e.g., implemented by hardware, software, or a combination thereof.

Figure 8:
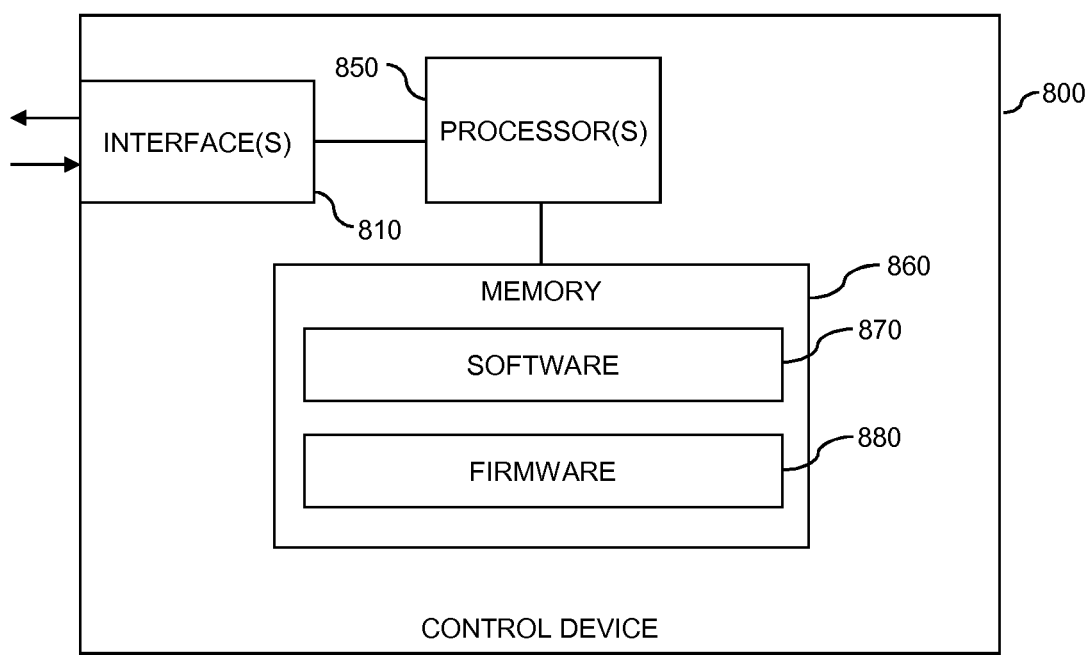
FIG. 8 schematically illustrates structures of a device according to an embodiment of the invention.

FIG. 8 illustrates a processor-based implementation of a device 800 which may be used for implementing the above-described concepts. For example, the structures as illustrated in FIG. 8 may be used for implementing the concepts in any of the above-mentioned entities 10, 100, 210, 220, 230, 240, or 300.

As illustrated, the device 800 includes one or more interfaces 810. In some scenarios, the interfaces 810 may include a radio interface for performing the multi-antenna transmissions. Such radio interface could be based on the LTE technology or the NR technology.

Further, the device 800 may include one or more processors 850 coupled to the interface(s) 810 and a memory 860 coupled to the processor(s) 850. By way of example, the interface(s) 810, the processor(s) 850, and the memory 860 could be coupled by one or more internal bus systems of the device 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870 and/or firmware 880. The memory 860 may include suitably configured program code to be executed by the processor(s) 850 so as to implement the above-described functionalities of a device for controlling multi-antenna transmission, such as explained in connection with FIGS. 6 and 7.

It is to be understood that the structures as illustrated in FIG. 8 are merely schematic and that the 800 may actually include further components which, for the sake of clarity, have not been illustrated, e.g., further interfaces or processors. Also, it is to be understood that the memory 860 may include further program code for implementing known functionalities of a transmitter device or receiver device, e.g., known functionalities of an access node or of a UE. According to some embodiments, also a computer program may be provided for implementing functionalities of the device 800, e.g., in the form of a physical medium storing the program code and/or other data to be stored in the memory 860 or by making the program code available for download or by streaming.

As can be seen, the concepts as described above may be used for efficiently controlling multi-antenna transmission. Specifically, computational complexity of an MMSE based precoding algorithm may be reduced by replacing the matrix inversion in the calculations with one matrix multiplications per iteration. In many cases, two matrix multiplications may be sufficient to calculate the precoding matrix.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of transmitter devices and receiver devices. Further, the concepts may be applied with respect to various numbers of antennas in the transmitter device, e.g., two or more, various numbers of antennas in the receiver device(s), e.g., two or more, and various numbers of receiver devices. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling multi-antenna transmission, the method comprising:

determining a channel matrix representing characteristics of a multi-path channel between a transmitter device equipped with multiple transmitter antennas and at least one receiver device equipped with one or more receiver antennas, the channel matrix being organized in one or more channel vectors each associated with a corresponding one of the one or more receiver antennas;

applying an iterative optimization algorithm to determine a precoding matrix from the channel matrix;

setting at least one step size of the iterative optimization algorithm depending on a vector norm of at least one of the one or more channel vectors; and controlling multi-antenna transmission by the transmitter device based on the determined precoding matrix.

2. The method according to claim 1,
wherein the precoding matrix is composed of multiple weight vectors each being associated with a corresponding one of the receiver antennas, and
wherein multiple step sizes of the iterative optimization algorithm are set individually for each of the multiple weight vectors, depending on the vector norm of the associated channel vector.

3. The method according to claim 1, further comprising setting the at least one step size to be inversely proportional to the vector norm of the at least one channel vector.

4. The method according to claim 1, comprising:
determining a precoding matrix for each of multiple different frequencies;
wherein for at least one of the frequencies in a first iteration of the iterative optimization algorithm an initial state of the precoding matrix is based on a precoding matrix as previously determined for another frequency.

5. The method according to claim 1, further comprising stopping the iterative optimization algorithm in response to reaching a preconfigured number of iterations.

6. The method according to claim 5, wherein the preconfigured number of iterations is four or less.

7. The method according to claim 1, wherein each iteration of the iterative optimization algorithm comprises:
calculating an adjustment matrix based on the at least one step size, a present state of the precoding matrix, and the channel matrix; and
updating the present state of the precoding matrix by subtracting the adjustment matrix.

8. The method according to claim 7, wherein, in each iteration of the iterative optimization algorithm, calculating the adjustment matrix comprises only a single matrix multiplication.

9. The method according to claim 1, wherein the precoding matrix is determined by a minimum mean square error based algorithm.

10. The method according to claim 1, comprising determining the channel matrix based on measurements on signals transmitted from the receiver device to the transmitter device.

11. The method according to claim 1, comprising determining the channel matrix based on measurements on signals transmitted from the transmitter device to the at least one receiver device.

12. The method according to claim 1, wherein the transmitter device is an access node of a wireless communication network.

13. The method according to claim 1, wherein the at least one receiver device is a wireless communication device connected to the wireless communication network.

14. A device for controlling multi-antenna transmission, the device comprising:
at least one processor; and
a memory containing program code executable by the at least one processor, whereby execution of the program code by the at least one processor causes the device to:
determine a channel matrix representing characteristics of a multi-path channel between a transmitter device equipped with multiple transmitter antennas and at least one receiver device equipped with multiple receiver antennas, the channel matrix being organized in one or more channel vectors each associated with a corresponding one of the one or more receiver antennas;
apply an iterative optimization algorithm to determine a precoding matrix from the channel matrix;
set at least one step size of the iterative optimization algorithm depending on a vector norm of at least one of the one or more channel vectors; and
control multi-antenna transmission by the transmitter device based on the determined precoding matrix.

15. The device according to claim 14,
wherein the precoding matrix is composed of multiple weight vectors each being associated with a corresponding one of the receiver antennas, and
wherein execution of the program code by the at least one processor causes the device to set multiple step sizes of the iterative optimization algorithm individually for each of the multiple weight vectors, depending on the vector norm of the associated channel vector.

16. The device according to claim 14, execution of the program code by the at least one processor causes the device to set the at least one step size to be inversely proportional to the vector norm of the at least one channel vector.

17. The device according to claim 14, execution of the program code by the at least one processor causes the device to determine a precoding matrix for each of multiple different frequencies, wherein for at least one of the frequencies in a first iteration of the iterative optimization algorithm an initial state of the precoding matrix is based on a precoding matrix as previously determined for another frequency.

18. The device according to claim 14, execution of the program code by the at least one processor causes the device to stop the iterative optimization algorithm in response to reaching a preconfigured number of iterations.

19. The device according to claim 18, wherein the preconfigured number of iterations is four or less.

20. The device according to claim 14,
wherein each iteration of the iterative optimization algorithm comprises:
calculating an adjustment matrix based on the at least one step size, the present state of the precoding matrix, and the channel matrix; and
updating the present state of the precoding matrix by subtracting the adjustment matrix.

* * * * *